United States Patent
Yosim et al.

(10) Patent No.: US 7,274,283 B2
(45) Date of Patent: Sep. 25, 2007

(54) METHOD AND APPARATUS FOR RESISTING HARDWARE HACKING THROUGH INTERNAL REGISTER INTERFACE

(75) Inventors: Paul Stewart Yosim, Apex, NC (US); Irfan Rashid, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 10/835,462

(22) Filed: Apr. 29, 2004

(65) Prior Publication Data

US 2005/0242924 A1    Nov. 3, 2005

(51) Int. Cl.
*G05B 19/00* (2006.01)

(52) U.S. Cl. .................. 340/5.74; 340/5.2; 340/14.31; 340/14.61; 711/101; 711/102; 711/103; 711/104; 711/105

(58) Field of Classification Search ............... 340/5.74, 340/5.1, 5.2, 14.31, 14.61; 713/183; 711/101, 711/102, 103, 104, 105; 455/558, 411
See application file for complete search history.

(56) References Cited

U.S. PATENT DOCUMENTS

| | | | |
|---|---|---|---|
| 5,297,268 A * | 3/1994 | Lee et al. ................... | 711/164 |
| 6,487,646 B1 * | 11/2002 | Adams et al. .............. | 711/163 |
| 6,998,232 B1 * | 2/2006 | Feinstein et al. .............. | 435/6 |
| 2002/0013935 A1 * | 1/2002 | Boggs et al. ................... | 717/4 |
| 2004/0097266 A1 * | 5/2004 | Aerrabotu et al. ........... | 455/558 |
| 2005/0135170 A1 * | 6/2005 | Mozdzen .................... | 365/211 |

* cited by examiner

*Primary Examiner*—Brian Zimmerman
*Assistant Examiner*—Vernal Brown
(74) *Attorney, Agent, or Firm*—Patterson & Shaeridan, LLP

(57) ABSTRACT

Methods and apparatus that allow restricted access to internal registers of an integrated circuit (IC) device via an interface are provided. Unrestricted access to internal registers via the interface may be allowed during a manufacturing process to allow device testing. After such testing is complete, the device may be placed in a restricted access mode, for example, by blowing a master "lock" fuse, to prevent unrestricted access to one or more of the internal registers via the interface. However, full or partial access to the internal registers may still be provided via an access code or "combination lock" allowing the master fuse lock, in effect, to be bypassed.

17 Claims, 5 Drawing Sheets

METHOD AND APPARATUS FOR RESISTING HARDWARE HACKING THROUGH INTERNAL REGISTER INTERFACE

BACKGROUND OF THE INVENTION

1. Field of the Invention

The present invention generally relates to integrated circuit (IC) devices and, more specifically, to methods and systems to prevent unauthorized access to internal registers of IC devices.

2. Description of the Related Art

Many integrated circuit (IC) devices, such as systems on a chip (SOCs) and other type very large scale integrated (VLSI) devices include interfaces that provide access to internal registers, allowing the devices to be tested during the manufacturing process in an efficient manner. Examples of such interfaces include level-sensitive scan design (LSSD) scan chains and the JTAG interface, named after the Joint Test Action Group committee that established the test access port (TAP) and boundary-scan architecture defined in IEEE Standard 1149. Testing algorithms that utilize such interfaces to modify and examine the internal workings of the device by reading/writing the device's internal registers are well known.

Unfortunately, however, these same interfaces may also provide an interface or "backdoor" for a hardware hacker to gain access to the device. This may not be a problem for many devices on the market, since there may be little economic or emotional gain to breaking into those chips. For other devices, however, such as those used in video game consoles, satellite decoders, and the like, there may be more to gain. In such systems, encryption is often employed to protect proprietary data (e.g., copyrighted game data or subscriber-only media signals). Providing access to internal registers via an LSSD or JTAG interface may allow a hacker to interrogate and/or modify such data in its unencrypted form, thus bypassing security.

One solution to prevent unauthorized access to internal registers would be to disable the interface, for example, by blowing a fuse on the chip after the manufacturing tests are complete. This would certainly prevent subsequent internal register access by a hardware hacker via the interface. However, a problem with this approach is that permanently disabling the interface after manufacturing would also prevent testing (e.g., failure analysis) of field failures that come back to the manufacturer.

Accordingly, there is a need for methods and apparatus for preventing unauthorized access to internal registers while still allowing authorized access to those same internal registers.

SUMMARY OF THE INVENTION

The present invention generally relates to methods and apparatus for providing restricted access to internal registers.

One embodiment provides an integrated circuit (IC) device generally including a plurality of internal registers, non-volatile storage for storing one or more internal access codes, and an interface. The interface is generally configured to, when the device is in a restricted access mode, provide an external device with access to the internal registers only if one or more access codes supplied by the external device match one or more of the internal access codes.

Another embodiment provides a method for restricting access to internal registers of an integrated circuit (IC) device. The method generally includes providing one or more internal access codes in non-volatile storage elements internal to device and placing the device in a restricted access mode. In the restricted access mode, one or more of the internal registers is provided to an external device only if the external device supplies one or more access codes matching one or more of the internal access codes.

Another embodiment provides a method of providing restricted access to internal registers of an integrated circuit (IC) device. The method generally includes receiving one or more access codes supplied by an external device, comparing the one or more access codes supplied by the external device to one or more access codes stored on the device, and granting access to one or more of the internal registers only if the one or more access codes supplied by the external device match the one or more access codes stored on the device.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention allow restricted access to internal registers of an integrated circuit (IC) device via an interface. Unrestricted access to internal registers via the interface may be allowed during a manufacturing process to allow device testing. After such testing is complete, a master "lock" fuse may be blown to prevent unrestricted access to one or more of the internal registers via the interface. However, full or partial access to the internal registers may still be provided via an access code or "combination lock" allowing the master fuse lock, in effect, to be bypassed. Restricting access to internal registers in this manner allows testing of devices after the manufacturing process, while still preventing unauthorized access or hardware hacking.

Figure 1:
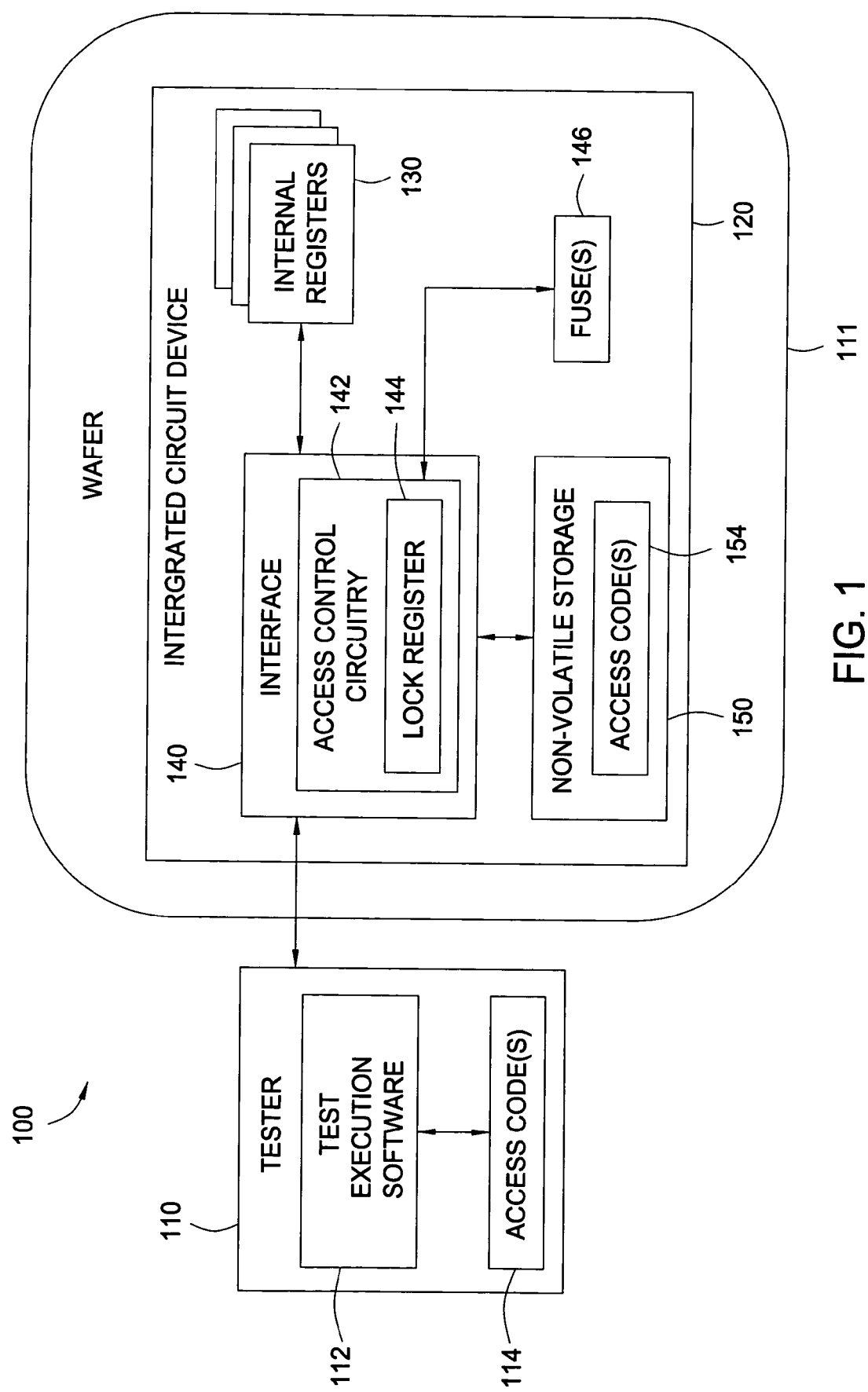
FIG. 1 illustrates an exemplary system in accordance with one embodiment of the present invention.
Figure 2:
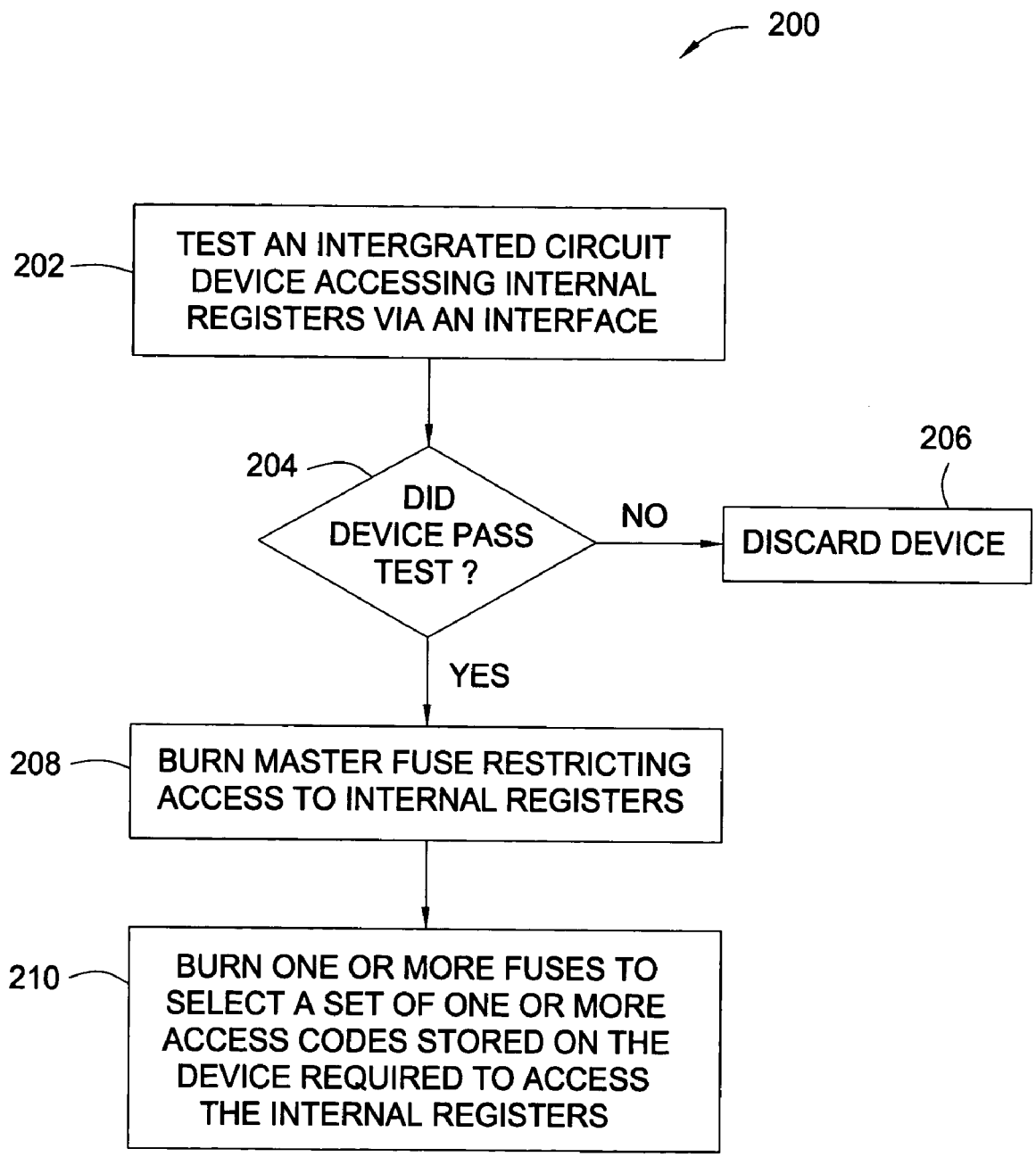
FIG. 2 is a flow diagram of exemplary operations for testing a device in accordance with one embodiment of the present invention.

FIG. 1 illustrates a conventional manufacturing environment 100 in which a tester 110 performs tests on an integrated circuit device 120 in accordance with one embodiment of the present invention. As illustrated, the device 120 may be one of many such devices on a wafer 111, which may all be tested. The tester 110 generally includes any suitable combination of hardware and test execution software 112 configured to initiate test sequences on the device 120. FIG. 2 is a flow diagram of exemplary operations 200 that may be performed by the tester 110, for example, to test the device 120 during a manufacturing process.

The operations 200 begin, at step 202, by testing the device 120 using an interface 140 providing access to internal registers 130 of the device 120. The interface 140 may include any combination of standard (e.g., LSSD or JTAG) or proprietary interfaces allowing access to internal registers 130, which may be modified and/or examined during the testing. As is well known, for some embodiments, the device 120 may include built in test (BIST) circuitry (not shown) and the internal registers 130 may include registers to configure such BIST circuitry and/or read results of tests performed thereby. For some embodiments, one interface (e.g., LSSD) may be used during manufacturing testing while a relatively high number access pins used for that interface are readily accessible (e.g., at the wafer level) and another interface (e.g., JTAG) may be used when fewer pins are available (e.g., at the device level).

Restricting Access to Internal Registers

If the device does not pass the test, as determined at step 204, the device is discarded, at step 206. On the other hand, if the device passes the test, one or more fuses 146 on the device 120 may be blown to restrict access to the internal registers 130 without an access code. For example, at step 208, a master fuse may be blown, in effect placing the device 120 in a restricted access mode, in which access to some or all of the internal registers 130 may be prevented without first entering an access code (e.g., a string of values) via the interface 140.

For some embodiments, once the master fuse is blown, if the access code is not first entered, access to some or all of the internal registers 130 may be prevented entirely. For other embodiments, if the access code is not first entered data patterns written into or read out of the internal registers may be in some way corrupted (e.g., by selectively XORing register scan outputs with a "lock" signal described below). An advantage of this latter approach is that it may not be obvious to a hacker that the chip has been locked and Therefore needs to be hacked. Further, even if the hacker realizes an access code should be entered, it may not be obvious to the hacker when the correct access code was entered. In any case, the fuse(s) 146 act as a unit to affect access to internal registers 130 via the interface 140, while entry of a proper access code serves to bypass the fuses. For some embodiments, a master fuse may not be utilized, but rather, the device may always be in a restricted access mode, requiring access codes to be used even during manufacturing tests.

As illustrated in FIG. 1, one or more access codes 154 may be stored in non-volatile storage 150 on the device 120. The non-volatile storage 150 may include any type of non-volatile storage elements, including any type of read-only memory (ROM) elements or any type of fuses, such as electrically programmable or laser fuses. For some embodiments, the access codes may be stored in non-volatile storage 150 as part of the manufacturing process (e.g., upon completion of a test, the tester 110 may "write" the access codes to the non-volatile storage). For other embodiments, the access codes may be stored upon fabrication of the device 120. In any case, a corresponding set of access codes 114 may be maintained by the manufacturer (e.g., at the tester 110), allowing full access to internal registers 130 for devices 120, for example, allowing analysis of devices 120 that have failed in the field.

For some embodiments, in addition to burning the master fuse, one or more fuses may also be burned to select a set of access codes required to access internal registers 130 (step 210). For example, multiple sets of access codes 154 may be stored in the non-volatile storage 150 and different sets may be selected for use by burning different fuses 146. This may allow different access codes to be selected, for example, for different versions of a device 120, which may help to improve security. For example, if it is learned a hacker has obtained one set of access codes 154, a different set of access codes 154 may be selected for subsequent versions of the device 120 by burning different fuses 146. Further, in some cases, the set of access codes 154 used by a particular device 120 may be changed, for example, by blowing additional fuses 146 (e.g., assuming electrically programmable fuses).

In any case, the device 120 may include access control circuitry 142 configured to restrict access to the internal registers 130 via the interface 140, based on access codes provided by an external device. Hence, the access control circuitry 142 acts, in effect, as a "combination lock" serving to lock the interface 140, until the proper "combination" of access codes is entered. As described above, operation of the access control circuitry 142 may be controlled, at least in part, based on the state of fuses 146. For example, prior to blowing a master fuse, the access control circuitry may be effectively bypassed. For embodiments utilizing multiple sets of access codes, once the master fuse is blown, the access control circuitry 142 may examine the state of other fuses 146 to determine which set of access codes to use.

Figure 4:
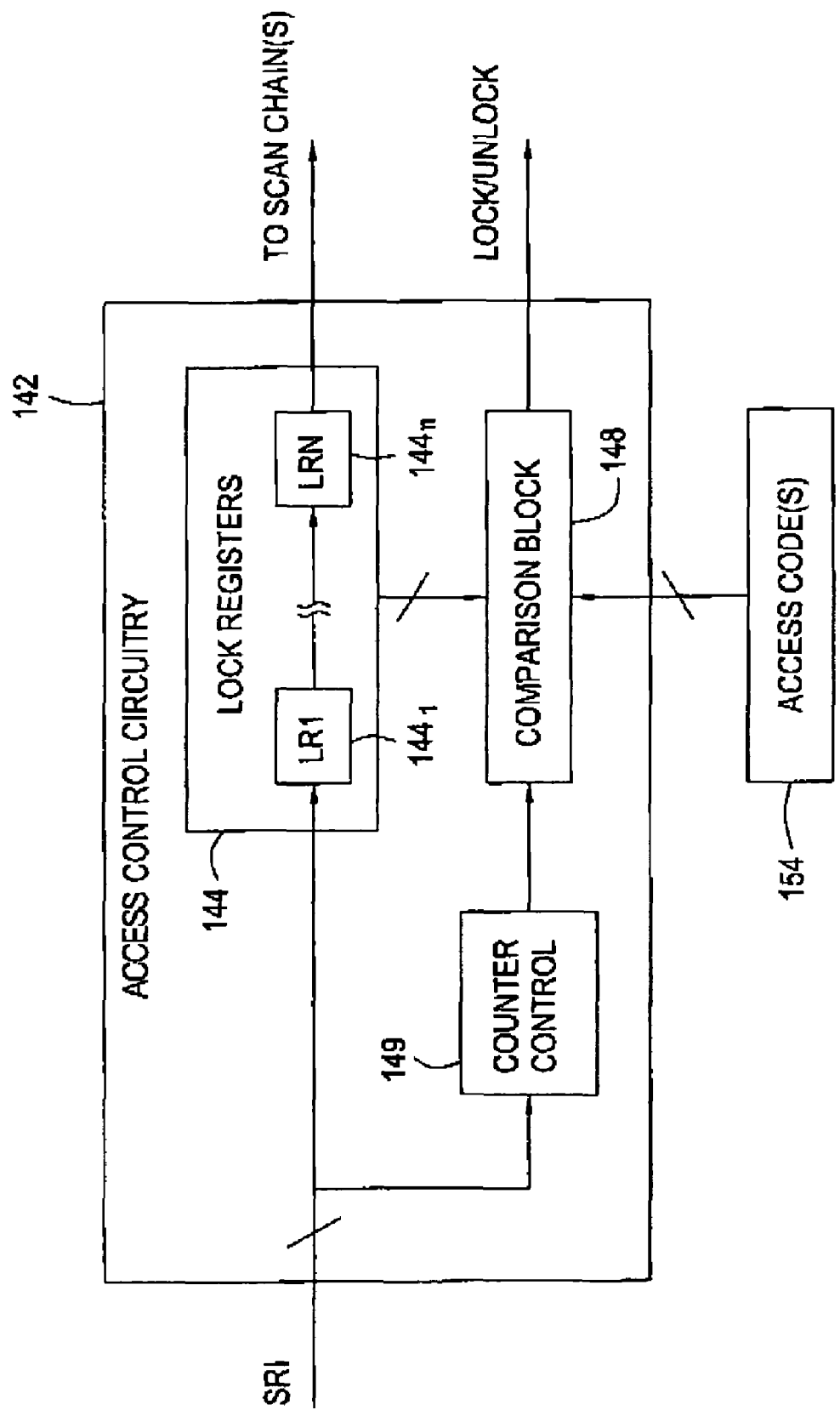
FIG. 4 is a block diagram of access control circuitry in accordance with one embodiment of the present invention.

As illustrated, the access control circuitry 142 may include one or more lock registers 144 for receiving the externally supplied access codes. For some embodiments, the lock registers 144 may consist of a serial string of registers (e.g., registers $144_1$-$144_N$ as shown in FIG. 4 described below) acting as a shift register. In any case, the lock registers 144 may be considered internal registers, in effect, that are always accessible via the interface 140. When an external device attempts to access the internal registers 130, the access control circuitry 142 may compare the access codes received in the lock registers 144 to one or more access codes 154 stored in non-volatile memory 150.

Figure 3:
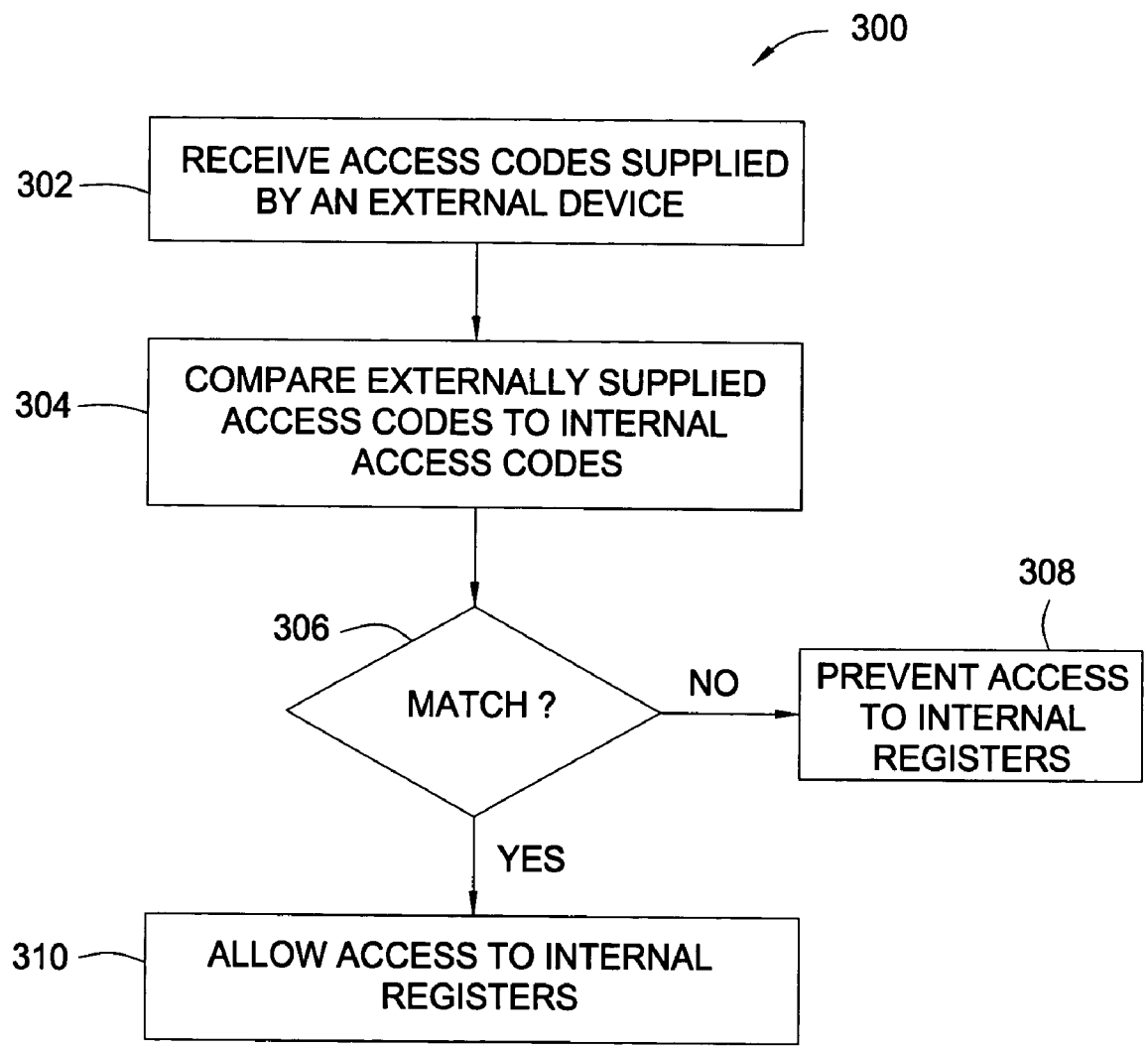
FIG. 3 is a flow diagram of exemplary operations for accessing internal registers of a device in accordance with one embodiment of the present invention.

FIG. 3 is a flow diagram of exemplary operations 300 that may be performed by the access control circuitry 142 when the device 120 is in a restricted access mode (e.g., with the master fuse blown). The operations 300 begin, at step 302, by receiving one or more access codes supplied by an external device, which may be stored in the lock registers 144. At step 304, the externally supplied access codes are compared to internal access codes 154 (in the non-volatile storage 150). If there is not a match, as determined at step 306, the external device is prevented access to the internal registers, at step 308. On the other hand, if there is a match, the external device is allowed access to the internal registers 130, at step 310.

For some embodiments, results of the comparison may control access to the internal registers 130 until the device 120 detects a power-on reset (POR) or some other type of time-consuming reset. In other words, an external device that enters a correct access code may have access to the internal registers 130 until such a reset occurs. Similarly, an external device that enters an incorrect access code may be prevented access to the internal registers until a reset occurs. In any case, such a feature may prevent hackers from learning access codes, for example, by running an automated program that continuously attempt to access the internal registers 130 using newly generated access codes with each attempt. Requiring a time-consuming reset, such as a POR, after each attempt may add substantial time and make searching for an access code using such a program unfeasible.

As illustrated in FIG. 4, for some embodiments, lock registers 144 may consist of a serial chain of registers $144_1$-$144_N$ that are part of a serial scan chain, such as a boundary scan chain to which unrestricted access may always be granted (e.g., the master fuse may be located such that access to the boundary scan chain is not affected). In such embodiments, access codes supplied by an external device may be loaded in the lock registers 144 during a scan-in loading procedure. Various approaches may be utilized to determine when the lock registers 144 are loaded with the externally supplied access codes (e.g., it may be dictated that the first bit in the serial string be a logic "one" and logic to detect the emergence of this first logic "one" at the end or out of the shift register could generate a signal or set a control bit).

As an alternative, the access control circuitry 142 may also include counter control circuitry 149 that monitors a shift clock signal and provides a signal to a comparison block 148 after a predetermined number of clock cycles (e.g., after a reset event), indicating the lock registers 144 should contain the externally supplied access codes. In response to the signal, the comparison block 148 may compare the access codes in the lock registers 144 to the internal access codes 154 and generate an unlock signal if there is a match. Thus, the counter control circuitry 149 may ensure that the access control circuitry 142 only responds to an initial serial string, and not to an ongoing serial string. As previously described, the access control circuitry may also require the device 120 be reset before access codes are again entered (e.g., the generated lock/unlock signal may be maintained until the reset).

Partial or Selective Access to Internal Registers

For some embodiments, different sets of internal registers may be accessed using different access codes. For example, a first set of internal registers may be accessed using a first access code, while a second set of internal registers may be accessed using a second access code. In some cases, the first and second sets of internal registers may be accessed independently. In other cases, the second set of internal registers may only be selected if both the first and second access codes are entered, possibly in that order. As previously described, however, some registers (e.g., a third set of registers) may not require an access code.

Figure 5:
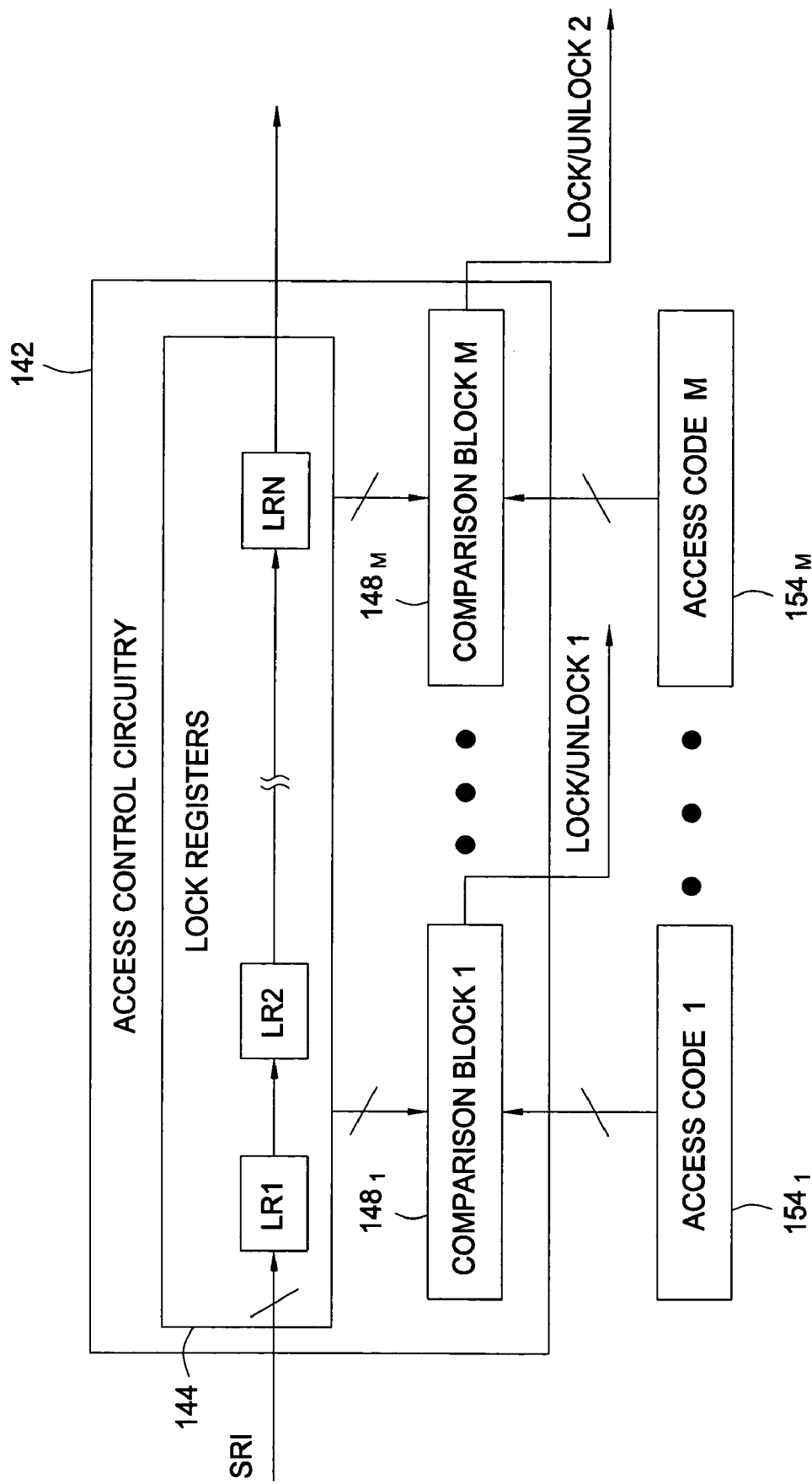
FIG. 5 is a block diagram of access control circuitry in accordance with another embodiment of the present invention.

As illustrated in FIG. 5, for embodiments where different sets of internal registers are accessed using different access codes, the access control circuitry 142 may include multiple (M) comparison blocks $148_1$-$148_M$, each associated with a different access code $154_1$-$154_M$. Each comparison block 148 may generate a different lock/unlock signal, indicating whether the associated access code 154 has been entered. The interface may provide/prevent access to different sets of internal registers based on the state of these different lock/unlock signals. For embodiments where multiple access codes must be entered to access a set of internal registers, additional logic (not shown) may be included to monitor the state of multiple lock/unlock signals, for example, and determine the order the access codes were entered, if necessary.

CONCLUSION

By restricting access to internal registers of a device, unauthorized hardware hacking of the device may be prevented and/or deterred. By allowing access to the internal registers to those with proper access codes, however, the internal registers may still be accessed for legitimate purposes, such as post-manufacturing testing or failure mode analysis.

While the foregoing is directed to embodiments of the present invention, other and further embodiments of the invention may be devised without departing from the basic scope thereof, and the scope thereof is determined by the claims that follow.

What is claimed is:

1. An integrated circuit (IC) device, comprising:
   a plurality of internal registers;
   non-volatile storage for storing one or more internal access codes, the one or more access code comprise at least two sets of one or more internal access codes;
   an interface configured to operate in one of an unrestricted access mode and a restricted access mode, wherein, when the device is in the unrestricted access mode, access to the internal registers is available without providing an access code, and, when the device is in the restricted access mode, access to the internal registers is available only if one or more access codes supplied by an external device match one or more of the internal access codes;
   a master fuse for placing the device in the restricted access mode from the unrestricted access mode; and the device further comprises one or more fuses for selecting one of the sets of internal access codes.

2. The device of claim 1, wherein the non-volatile storage elements comprise fuses.

3. The device of claim 1, wherein the one or more internal access codes comprise:
   a first access code associated with a first set of one or more of the internal registers; and
   a second access code associated with a second set of one or more of the internal registers.

4. The device of claim 3, wherein the interface is configured to provide the external device with access to the second set of internal registers only if access codes supplied by the external device match the first and second access codes.

5. The device of claim 1, further comprising lock registers for holding access codes supplied by the external device.

6. The device of claim 5, wherein the lock registers are part of a serial scan chain accessible via the interface.

7. The device of claim 1, wherein the interface comprises at least one of a level sensitive scan design (LSSD) interface and an interface compliant with IEEE Standard 1149.

8. A method for restricting access to internal registers of an integrated circuit (IC) device, comprising:
   providing one or more internal access codes in non-volatile storage elements internal to the device, the one or more internal access codes comprises a plurality of access codes and each access code is associated with one or more internal registers; and
   placing the device in a restricted access mode from an unrestricted access mode by burning one or more fuses, wherein, when the device is in the unrestricted access mode, access to the internal registers is available without providing the one or more internal access codes, and, when the device is in the restricted access mode, access to one or more of the internal registers is provided to an external device only if the external device supplies one or more access codes matching one or more of the internal access codes.

9. The method of claim 8, wherein:
the plurality of access codes comprises multiple sets of access codes; and
placing the device in the restricted access mode comprises burning a first one or more fuses to select a first one of the multiple sets of access codes for use in restricting access to one or more of the internal registers.

10. The method of claim 9, further comprising, subsequent to burning the first one or more fuses, burning a second one or more fuses to select a second one of the multiple sets of access codes for use in restricting access to one or more of the internal registers.

11. A method of providing restricted access to internal registers of an integrated circuit (IC) device, comprising:
receiving one or more access codes supplied by an external device;
determining if a current mode of the device is one of a restricted access mode and an unrestricted access mode, wherein a state of one or more fuses indicates the current mode of the device;
if the current mode of the device is the unrestricted access mode, granting access to one or more of the internal registers without requiring an access code; and
if the current mode of the device is the restricted access mode:
comparing the one or more access codes supplied by the external device to one or more access codes stored on the device; and
granting access to one or more of the internal registers only if the one or more access codes supplied by the external device match the one or more access codes stored on the device.

12. The method of claim 11, wherein:
comparing the one or more access codes supplied by the external device to one or more access codes stored on the device comprises comparing first and second access codes supplied by the external device to first and second access codes stored on the device; and
granting access to one or more of the internal registers comprises granting access to a first set of internal registers only if the first access code supplied by the external device matches the first access code stored on the device and granting access to a second set of internal registers only if the second access code supplied by the external device matches the second access code stored on the device.

13. The method of claim 12, further comprising granting access to the second set of internal registers only if the first access code supplied by the external device matches the first access code stored on the device.

14. The method of claim 11, further comprising, in response to detecting the one or more access codes provided by the external device do not match the one or more access codes stored on the device, preventing access to one or more of the internal registers until a reset condition occurs regardless of access codes supplied by the external device.

15. The method of claim 11, wherein receiving one or more access codes supplied by an external device comprises shifting the one or more access codes into one or more serial shift registers.

16. The method of claim 15, further comprising:
monitoring, following a reset event, a predetermined number of clock cycles during the shifting; and
comparing the one or more access codes supplied by the external device to one or more access codes stored on the device in response to detecting the predetermined number of clock cycles after the reset event.

17. The method of claim 11, wherein comparing the one or more access codes supplied by the external device to one or more access codes stored on the device comprises examining a state of one or more fuses to select, from a plurality of sets of one or more access codes stored on the device, a set of one or more access codes to use for the comparison.

* * * * *